United States Patent Office 3,449,353
Patented June 10, 1969

3,449,353
N,N'-DIGLYCIDYL HYDANTOINS
Daniel Porret, Binningen, and Rudolf Aenishaenslin, Reinach, Switzerland, assignors to Ciba Limited, Basel, Switzerland, a company of Switzerland
No Drawing. Filed June 2, 1967, Ser. No. 643,046
Claims priority, application Switzerland, June 23, 1966, 9,119/66; Nov. 7, 1966, 16,001/66; Apr. 10, 1967, 5,083/67
Int. Cl. C07d 49/32; D06p 1/02
U.S. Cl. 260—309.5          9 Claims

ABSTRACT OF THE DISCLOSURE

N,N'-diglycidyl compounds of the general formula

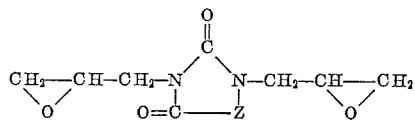

(I)

wherein Z represents a member selected from the group consisting of the group $>C=O$ and a group

in which $R_1$ and $R_2$ each are members selected from the group consisting of hydrogen atom and alkyl group, and $R_1$ and $R_2$ together form a bivalent radical selected from the group consisting of tetramethylene radical and pentamethylene radical. The compounds are useful for fixing of dyestuffs, at adhesives and as intermediates.

---

The present invention provides N,N'-diglycidyl compounds of the formula

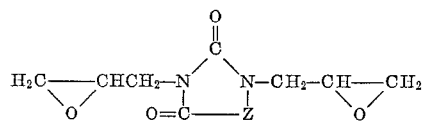

(I)

wherein Z represents the group $>C=O$ or a group

in which $R_1$ and $R_2$ each denote a hydrogen atom or an aliphatic or cycloaliphatic hydrocarbon residue, preferably a lower alkyl residue having 1 to 4 carbon atoms, or in which $R_1$ and $R_2$ jointly form a bivalent aliphatic or cycloaliphatic hydrocarbon residue, preferably a tetramethylene or pentamethylene residue. The compounds of Formula I where $R_1$ and $R_2$ are hydrogen atoms or lower alkyl residues, are as a rule water-soluble.

Compounds of the above general formula are new and may be manufactured by methods which are in themselves known. The preferred procedure is to convert the residues X in a compound of the formula

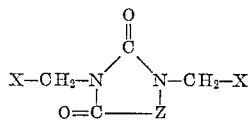

(II)

wherein Z has the significance given above and the residues X are residues which can be converted to 1,2-epoxyethyl residues, into epoxyethyl residues.

A residue X which can be converted to a 1,2-epoxyethyl residue is above all a hydroxyhalogenethyl residue which has the functional groups on different carbon atoms, especially a 2-halogen-1-hydroxyethyl residue. For this, the halogen atoms are especially chlorine or bromine atoms. The reaction takes place in the usual manner, above all in the presence of reagents which eliminate hydrogen halides such, for example, as strong alkalies, for example, anhydrous sodium hydroxide or aqueous sodium hydroxide solution. However, other strong alkaline reagents such, for example, as potassium hydroxide, barium hydroxide, calcium hydroxide, sodium carbonate or potassium carbonate may also be used for this.

A further residue X which can be converted to a 1,2-epoxyethyl residue is, for example, the ethenyl residue which can be converted to a 1,2-epoxyethyl residue in a known manner, above all by reaction with hydrogen peroxide or with a per-acid, for example, peracetic or perbenzoic acid or phthalic-mono-per-acide.

The starting substances of Formula II may be obtained in a manner which is in itself known. Thus, for example, a compound of the formula

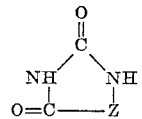

(III)

wherein Z has the significance given above can be reacted with a compound of formula X—CH$_2$—Hal, wherein Hal represents a halogen atom and X has the significance given above. The compound of Formula III is preferably reacted with an epihalogenohydrin, above all epichlorhydrin, in the presence of a catalyst, especially a tertiary amine, a quaternary ammonium base or a quaternary ammonium hydroxide.

Suitable catalysts for the addition of epichlorhydrin are above all tertiary amines such, for example, as triethylamine, tri-n-propylamine, benzyldimethylamine, N,N'-dimethylaniline and triethanolamine; quaternary ammonium bases such, for example, as benzyl trimethylammonium hydroxide; quaternary ammonium salts such, for example, as tetramethylammonium chloride, benzyl trimethylammonium chloride, benzyl trimethylammonium acetate, methyl triethylammonium chloride; furthermore, ion exchange resins having tertiary or quaternary amino groups as well as ion exchange compounds with acid amide groups. Basic impurities which can occur in commercial forms of the starting compounds (III) may also act as catalysts. In such cases it is not necessary to add a special catalyst.

The invention also includes those forms of the process which start from a compound obtainable as an intermediate at any stage and carry out the missing stages, or in which a starting substance is formed under the reaction conditions or is further processed without isolation.

A preferred form of the process is, for example, that an epihalogenohydrin, preferably epichlorhydrin, is reacted with a compound of Formula III in the presence of a catalyst such, for example, as preferably a tertiary amine, a quaternary ammonium base or a quaternary ammonium salt, and that in a second stage the resulting product containing halogenohydrin groups is treated with reagents which eliminate hydrogen halide. In these reactions the procedure described above is followed, and as catalysts for the addition of epihalogenohydrin or for the dehydrohalogenation of the compounds mentioned above may be employed. At the same time particularly good yields are obtained if an excess of epichlorohydrin is used. During the first reaction, before the addition of alkali, a partial epoxidation of the dichlorhydrin of the alkylene-urea already takes place. The epichlorhydrin which acts as the hydrogen chloride acceptor is then partially converted to glycerine dichlorhydrin.

Possible starting compounds of Formula III are above all parabanic acid, hydantoin, 5-methyl-hydantoin and 5,5-dimethylhydantoin. N,N'-diglycidyl - 5,5 - dimethylhydantoin is obtained in particularly good yield in accordance with the process described. This compound, which gives a completely clear solution in water, is distinguished by particularly valuable technical properties, especially as a textile and dyeing aid.

The diepoxides of the invention, of Formula I, react with the usual curing agents for epoxide compounds. They can therefore be cross-linked or cured by the addition of such curing agents, analogously to other polyfunctional epoxide compounds or epoxide resins respectively. Possible curing agents of this kind are basic or acid compounds.

The following have proved suitable: amines or amides such, for example, as aliphatic and aromatic primary, secondary and tertiary amines, for example, p-phenylenediamine, bis-(p-aminophenyl)-methane, ethylenediamine, N,N - diethylethylenediamine, diethylenetriamine, tetra-(hydroxyethyl) - diethylenetriamine, triethylenetetramine, N,N-dimethylpropylenediamine, Mannich bases such, for example, as tris-(dimethylaminomethyl)-phenol; dicyandiamide, melamine, cyanuric acid, urea-formaldehyde resins, melamine-formaldehyde resins, polyamides, for example, those of aliphatic polyamines and dimerised or trimerised unsaturated fatty acids, polyfunctional phenols, for example, resorcinol, bis-(4-hydroxyphenyl)-dimethylmethane, phenolformaldehyde resins, reaction products of aluminium alcoholates or aluminium phenolates with compounds which react tautomerically of the type of acetoacetic ester, Friedel-Crafts catalysts, for example $AlCl_3$, $SbCl_4$, $ZnCl_2$, $BF_3$ and their complexes with organic compounds such, for example, as $BF_3$-amine complexes, metal borofluorides such, for example, as zinc borofluoride; phosphoric acid; boroxines such, for example, as trimethoxy-boroxine; polybasic carboxylic acids and their anhydrides, for example, phthalic anhydride, tetrahydrophthalic anhydride, hexahydrophthalic anhydride, methylhexahydrophthalic anhydride, endomethylene-tetrahydrophthalic anhydride, methylendomethylene - tetrahydrophthalic anhydride (=methylnadic anhydride), hexachlor-endomethylene-tetrahydrophthalic anhydride, succinic anhydride, adipic anhydride, maleic anhydride, allylsuccinic anhydride, dodecenylsuccinic anhydride; 7-allyl-bicyclo (2.2.1)-hept-5-ene-2,3-dicarboxylic acid anhydride, pyromellitic acid dianhydride or mixtures of such anhydrides.

When curing with the anhydride accelerators may, if desired, be used at the same time, such, for example, as tertiary amines, their salts or quaternary ammonium compounds, for example, tris(dimethylaminomethyl)-phenol, benzyldimethylamine or benzyldimethylammonium phenolate, stannous salts of carboxylic acids such, for example, as stannous octoate or alkali metal alcoholates such, for example, as sodium hexylate.

When curing the polyepoxides of the invention with anhydrides it is appropriate to use 0.5 to 1.1 gram equivalents of anhydride groups per 1 gram equivalent of epoxide groups.

The term "cure" as used here denotes the conversion of the above diepoxides into insoluble and infusible cross-linked products, and generally with simultaneous shaping into shaped articles such as castings, mouldings or laminates or into two-dimensional structures such as lacquer films or adhesive bonds.

If desired, active thinners such, for example, as butylglycid, cresylglycid or 3-vinyl-2,4-dioxaspiro(5.5)-9, 10-epoxy-undecane may be added to the diepoxides of the invention in order to reduce the viscosity.

The diepoxides of the invention may furthermore be used as mixtures with other curable diepoxide or polyepoxide compounds. As examples of such there may be mentioned: polyglycidyl ethers of polyhydric alcohols or especially of polyhydric phenols such, for example, as resorcinol, bis - (4 - hydroxyphenyl) - dimethylmethane (=bisphenol A) or condensation products of formaldehyde with phenols (novolacs); polyglycidyl esters of polycarboxylic acids such, for example, as phthalic acid; aminopolyepoxides such, for example, as are obtained by the dehydrohalogenation of the reaction products of epihalogenohydrin and primary or secondary amines such, for example, as aniline or 4,4'-diaminodiphenylmethane, as well as alicyclic compounds containing several epoxide groups such as vinylcyclohexene dioxide, dicyclopentadiene diepoxide, ethylene-glycol-bis(3,4-epoxytetrahydrodicyclopentadiene-8-yl)ether, 3,4-epoxytetrahydrodicyclopentadienyl - 8 - glycidyl ether, (3',4'-epoxycyclohexylmethyl)-3,4-epoxycyclohexane-carboxylate, (3',4'-epoxy-6'-methylcyclohexylmethyl) - 3,4 - epoxy-6-methyl-cyclohexane-carboxylate, bis(cyclopentyl)ether diepoxide or 3-(3',4'-epoxy-cyclohexyl) - 2,4 - dioxospiro(5,5)-9,10-epoxy-undecane.

The present invention therefore also includes curable mixtures which are suitable for the manufacture of shaped articles, including two-dimensional structures, and which contain the diepoxides of the invention, optionally together with other diepoxides or polyepoxide compounds and furthermore curing agents for epoxy resins such, for example, as polyamines or polycarboxylic acid anhydrides.

The diepoxide compounds of the invention or their mixtures with other polyepoxide compounds and/or curing agents may furthermore, before cure, be mixed at any stage with fillers, plasticisers, pigments, dyestuffs, flame-retardant substances or mould release agents.

Extenders and fillers which may for example be used are asphalt, bitumen, glass fibres, cellulose, mica, quartz flour, hydrated aluminium oxide, gypsum, kaolin, ground dolomite, colloidal silicon dioxide of large specific surface area (Aerosil) or metal powders such, for example, as aluminium powder.

The curable mixtures may in the unfilled or filled state, optionally in the form of solutions or emulsions, serve as laminating resins, paints, lacquers, dipping resins, casting resins, moulding compositions, spreading compositions and putties, floor covering compositions, encapsulation and insulation compositions for electrotechnology, adhesives, especially for gluing moist or wet concrete, as well as for the manufacture of such products.

Those compounds of Formula I of the invention which are water-soluble, are especially suitable for use in the textile field, especially for the fixing of dyestuffs and as a finish on fabrics of all kinds such as wool, superpolyamide fibres, acrylonitrile fibres or above all regenerated or natural cellulose or cellulose/polyester mixtures. The textile material may be in the form of fibres, filaments, flocks, but preferably woven fabrics or knitted fabrics.

Suitable dyestuffs for fixing are quite generally such dyestuffs as contain at least one active hydrogen atom which is preferably bonded to a nitrogen, oxygen or sulphur atom. This comprises the appropriate azo dyestuffs, metal complex dyestuffs, anthraquinone dyestuffs, azomethine dyestuffs, triphenylmethane dyestuffs, oxazine, dioxazine or tetrazaporphine dyestuffs such as for example phthalocyanin dyestuffs and furthermore the optical brighteners of the stilbenes of the benzimidazole, benzoxazole or benzothiazole series.

The active hydrogen atoms may be present in primary or secondary amino groups, in heterocyclically bonded NH-groups, in substituted or unsubstituted sulphonamide groups or in hydroxyl and/or sulphydryl groups, or may also only be produced in the dye bath.

Preferably such dyestuffs are used as contain at least one group imparting solubility in water and at least one reactive amino group, with a procedure analogous to French patent specification No. 1,120,142 being followed.

Furthermore the diepoxides of Formula I of the invention are also preferentially used for fixing reactive dyestuffs, and especially reactive dystuffs having sulphato groups such, for example, as sulphatoethylsulphonamide, sulphatoethylsulphone, N-methylethionylamine and sulphatoethylcarbonamide groups. Dyestuffs with thiosulphate groups such, for example, as sulphamidoethylthiosulphate groups, and sulphur dyestuffs which are listed in the Colour Index under the description "C.I. solubilised sulphur dyes" and which are mostly solubilised by esterification, are particularly preferred.

Finally the diepoxides (I) are also particularly well suited to fixing water-soluble dyestuffs and optical brighteners containing onium groups, with the onium groups being ammonium, oxonium, hydrazinium or sulphonium groups but above all thiuromium groups.

The above-mentioned classes of dyestuffs may be fixed both by thermofixing and also by wet storage, especially in the presence of thioureas.

Instead of using the diepoxide of Formula I of the invention as the sole reactive resin component for the fixing process, they may also be used as mixtures with other known curable resins, especially aminoplasts, for example, melamine-formaldehyde, urea-formaldehyde and ethyleneureaformaldehyde condensation products, it being advantageous to use such aminoplastics as show a low chlorine retention capacity.

The diepoxides of Formula I of the invention may, apart from the fixing of dyestuffs on to textiles, also be used to manufacture pigments in bulk in the absence of substrates, by reacting them with the above-mentioned classes of dyestuffs or optical brighteners containing at least one active hydrogen atom, as such, optionally in the presence of other reaction components having a cross-linking effect, especially thiourea.

When fixing the dyestuffs on to textile substrates the impregnation or padding takes place under the usual conditions and in the usual equipment, such as is known for the finishing and dyeing of textiles. If so-called jet dryers are used the drying and cure can take place in one operation.

A simple process for fixing the above-mentioned classes of dyestuffs with the aid of the diepoxides of Formula I comprises impregnating the textile material about to be dyed with a solution which simultaneously contains the dyestuff and the diepoxide of Formula I and subjecting the goods which have been impregnated in this way to a heat treatment in order to fix the dyestuffs. The fixing takes place through heating or drying at 100 to 300° C. but can also be brought about by prolonged steaming. However it is advisable to fix the dyestuffs in the usual way by dry heating at temperatures between 160 and 240° C., preferably between 190 and 200° C., as long as the material to be dyed and/or printed permits the use of these temperatures. The duration of the fixing process can vary within wide limits since it depends on the nature of the particular dyestuffs used, the colourless polyfunctional compounds, the more or less strongly alkaline reagents and the material to be dyed, as well as on the fixing temperature; it can however easily be determined by experiments. It is advantageous to fix the dyestuff on to cellulose textile goods by dry heating at 100 to 200° C. In this temperature range the fixing of the dyestuffs is generally complete within about 1 to 5 minutes.

It is also possible to proceed by first padding the material which is to be dyed or printed with a dyestuff solution or printing it with a printing paste, which contains a suitable water-soluble organic dyestuff, drying the printed or impregnated goods, padding them, after an optional steaming or dry heat treatment, with an aqueous solution containing a diepoxide of Formula I of the invention, and again drying. The dyestuff solution which is to be padded may, in addition to the above-mentioned dyestuffs, contain various additives such, for example, as compounds which prevent migration (salts or alginates), solubilising agents (soda or caustic alkalies), wetting agents such, for example, as polyethylene oxide condensation products, hydrotropic substances (urea, formamides or sugar), and optionally also reducing agents (especially when using vat dyestuffs) such, for example, as sodium dithionite, thiourea dioxide, alkanesulphinate, alkali borohydrides, reductones such, for example, as trioses, or reductonates such as dihydroxyacetone.

After padding with the dyestuff solution the padded goods are dried, optionally also steamed, and subjected to thermofixing.

The post-treatment by steaming may be carried out on the Mather-Platt, on the continuous steamer at about 103 to about 105° C., or in a star steamer at about 110 to 115° C.

The thermofixing can, for example, take place on a stenter frame and may, for example, be carried out at about 130 to 240° C.

After drying, the material to be dyed or printed is padded with the solution of the diepoxide (I). This solution may contain additives such, for example, as alkalies (sodium carbonate, ammonia or sodium hydroxide solution) and optionally also oxidising agents, for example, hydrogen peroxide or perborates, which for example serve to reoxidise vatted dyestuffs.

Thus the process of the invention can be carried out with a single bath or with two baths, that is to say by padding on the dyestuff solution and simultaneously the polyfunctional compound or by treating the goods which are to be dyed and/or printed with the dyestuff and the diepoxide of Formula I successively and in the stated sequence. In this latter method (two baths) the goods to be dyed are preferably treated with dye baths or printing pastes which simultaneously contain alkaline reagents, the dyestuffs and hydrotropic compounds, especially thiourea. The goods treated in this way are then dried.

The diepoxides of Formula I may be used together with dispersing agents in a finely divided form or as solutions in water-miscible solvents. As water-miscible solvents for this there come into consideration above all dialkylcarboxylic acid amides such, for example, as dimethylformamide or dimethylacetamide, lactams such, for example, as N-methyl-2-pyrrolidone, ethers such, for example, as glycolether or tetrahydrofurane, but also alcohols such, for example, as methanol, ethanol or isopropanol, ketones such, for example, as acetane and/or organic acids such, for example, as formic acid or acetic acid.

The dye baths and printing pastes and the solutions of the diepoxides (I) may in addition to the above-mentioned dyestuffs and the diepoxides (I) respectively, contain the usual dyeing aids or printing aids, as long as these materials do not react in an undesired manner with the starting substances which are essential for the process. Such dyeing aids and printing aids are, for example, surface-active compounds such, for example, as alkylsulphonates, or compounds which prevent the migration of the dyestuffs such, for example, as sodium acetate, or materials which improve the solubility and the fixing of the dyestuffs such, for example, as urea, or thickening agents, for example oil-in-water emulsions, tragacanth pastes, alignates or methylcellulose.

The dyeings and printings obtainable in this way are generally distinguished by excellent wet fastness properties.

With water-insoluble dyestuffs the new process yields dyeings and printings of remarkably good abrasion resistance and solvent resistance.

However not only are printings and dyeings of significantly improved fastness properties, such, for example, as high chlorine, weathering and especially soda boiling fastness obtained, but the present process also offers the possibility, due to the practically quantitative fixing of the dyestuffs, of dispensing with the rinsing and soaping treatment, and this is important from the point of view of equipment and effluent technology. Because of the mild fixing conditions and the reagents of low reactivity the possibility of combination with other classes of dyestuffs (for example dispersion dyestuffs for cotton/polyester mixed fabric) also exists, whilst when printing the combination with pigment dyestuffs is not excluded.

The fixing or cure of the diepoxide compound (I) of the invention on to the textile material may however also take place by carrying out the impregnation in the presence of a catalyst, dissolved in the aqueous bath, which splits off acid on heating, and curing at an elevated temperature after drying.

As curing catalysts which split off acid on heating there may be mentioned, for example: ammonium salts of strong acids such, for example, as ammonium chloride, ammonium sulphate, ammonium silicofluoride or metal salts such, for example, as magnesium chloride or zinc nitrate, but preferably Friedel-Crafts catalysts such, for example, as aluminum chloride, boron fluoride and their complex compounds, especially zinc borofluoride.

The diepoxides (I) may also be cured by adding thioureas such, for example, as thiourea, N-acetyl-thiourea or N-benzoyl-thiourea, N-methyl-thiourea or N-ethyl-thiourea, N-benzyl-thiourea or N-phenyl-thiourea, N,N' - dimethyl - thiourea or N,N'-diisopropyl-thiourea tetramethyl - thiourea, thiohydantoin, thiobarbituric acid, ethylene-thiourea and especially unsubstituted thiourea itself, and again cure temperatures of between 160 and 240° C. are appropriate. Hot cure is particularly appropriate when fixing pigments with the aid of the diepoxides (I).

Furthermore the diepoxides of Formula I of the invention may also be used as cross-linking components for coating materials based on copolymers which in the polymer chain contain a small proportion of groups which contain active hydrogen atoms, especially free carboxyl groups. Suitable copolymers of this nature are especially at least ternary copolymers of (1) a small quantity of a free singly unsaturated monocraboxylic acid having a methylene group bonded to the α-carbon atom, (2) a nitrile of such an acid and (3) an unsaturated ester and optionally a further comonomer which is free of acid groups. As the acids (1) there may be mentioned acid such, for example, as methacrylic acid and above all acrylic acid, whereas as nitriles (2) there may be mentioned methacrylonitrile and preferably acrylonitrile. As polymerisable esters (3) there may be mentioned esters of an unsaturated alcohol such, for example as especially vinyl acetate, and alkyl, cycloalkyl, aryl or aralkyl esters of the acids (1). Copolymers which contain the last-named esters of the acids (1) are described in French patent specification No. 1,053,510. The copolymers may be used as aqueous dispersions or preferably as solutions in an organic solvent. In order to cross-link the copolymers completely the coatings produced with the diepoxides of Formula I of the invention may be heat-fixed in the usual manner.

The diepoxides of Formula I of the invention are further suitable as adhesives for the manufacture of non-woven textile-like structures especially fibre fleeces or fibre mats, by gluing the fibres at their point of contact. Fibre fleeces or mixed fibre fleeces of cellulose fibres such, for example, as cotton and rayon, cellulose acetate fibres, synthetic fibres such, for example, as polyamide fibres, polyester fibres, and also glass fibres, mineral fibres and slag fibres, can be manufactured. Depending on the nature of the fibres used the diepoxides of the invention may be used in the form of their solutions in water and/or organic solvents, by themselves or together with curring agents or curing catalysts as well as, optionally, other usual adjuvants such, for example, as plasticisers, materials for imparting hydrophobic properties, dyestuffs or pigments. The fibre fleeces or fibre mats are manufactured by known methods. For example loose fibre fleeces may be produced in a known manner by carding or by the random web process, and these webs may be subjected to a pre-treatment by pressing between hot rollers or by spraying on to them a small quanity of the adhesive, with subsequent heat treatment. Thereafter the fibre fleeces may be treated with the solutions of the diepoxides I of the invention, using known and conventional impregnating methods, this being done in such a way that bonding of the fibres takes place at the crossing or contact points whilst leaving the spaces between the fibres free, or largely free, of the impregnating substance. Thereafter the binder may be fixed by a heat treatment, for example, with hot air or hot steam or by contact heat, for example, with the aid of cylinder driers. Fixing may also take place by shock heat treatment, for example, by high frequency heating or infrared radiation.

The diepoxides (I) of the invention may also serve to improve rubber-fabric bonds, for example in the manufacture of tires, by preheating the fabrics, especially synthetic fabrics such, for example, as polyester fibre fabrics, with aqueous solutions of the diepoxides (I) and suitable curing agents such, for example, as amine curing agents.

The following examples illustrate the invention, the parts denoting parts by weight, and the percentages denoting percentages by weight; the ratio of the parts by weight to the parts by volume is the same as that of the kilogram to the litre.

Example 1

A mixture of 128 grams of 5,5-dimethyl-hydantoin, 2775 grams of epichlorhydrin and 1 gram of triethylamine was heated to boiling at 117° C. The epichlorhydrin adds to both NH groups with the formation of, firstly, N-chlorhydrin and then N-glycidyl groups. The formation of N-glycidyl groups during the reaction was followed by titration of samples after distilling off the unreacted epichlorhydrin. After 3 hours the resin contained 4.76 epoxide equivalents/kg. The mixture was cooled to 60° C. and thereafter 240 grams of 97% strength sodium hydroxide was added in stages over the course of 35 minutes. The temperature was kept at 60° C. by gentle cooling. After addition of the sodium hydroxide the mixture was stirred at 60° C. for a further 30 minutes. The reaction product was then concentrated under a vacuum of 35 mm. Hg until the entire quantity of the water formed had been azeotropically distilled off. Thereafter the resulting salt was filtered off and washed with a little epichlorhydrin. The product was then concentrated further, first under a vacuum of 20 mm. Hg in order to recover the excess epichlorhydrin and then under a vacuum of 0.2 mm. Hg in order to remove the last traces of volatile constituents.

237 grams of a clear yellow resin of low viscosity were obtained; this corresponds to 99% of the theoretical yield. The resin contained 7.7 epoxide equivalents/kg. and 2.5% of chlorine. The product was completely water-soluble. It principally consists of N,N'-diglycidyl-5,5-dimethyl-hydantoin.

The N,N' - diglycidyl-5,5-dimethylhydantoin described above, which contains 7.7 epoxide equivalents/kg. crystallised after 2 months to give a practically solid paste (further experiments have shown that the crystallisation takes place immediately after seeding).

80 grams of the crystalline paste were thoroughly suction-filtered through a glass filter. Whereupon 19 grams of a dark liquid and 60 grams of a crystalline almost colourless substance were obtained. This solid product contains 7.9 epoxide equivalents/kg. On recrystallisation from water a completely pure N,N' - diglycidyl-5,5-dimethyl-hydantoin is obtained. The product is in the form of water-soluble white crystals which melt at 72° C. Elementary analysis yields the following results.

Calculated: C, 54.99%; H, 6.71%; N, 11.66%; expoxide equivalents/kg., 8.33. Found: C, 55.01%; H, 6.64%; N, 11.64%, epoxide equivalents/kg., 8.32.

The above-mentioned crystalline mass can also be purified by trituration with an alcohol such, for example, as ethanol or isopropanol. A compound with 8.25 epoxide equivalents/kg. was obtained in this manner.

Example 2

A mixture of 68.5 grams of 5-methyl-hydantoin, 832.5 grams of epichlorohydrin and 0.3 gram of benzyl trimethylammonium chloride was brought to the boil at 118° C. After 2½ hours a resin of 4.1 epoxy equivalents/kg. was obtained after removal of the epichlorohydrin. The mixture was then cooled to 60° C. and 54.6 grams of 97% strength sodium hydroxide were added in stages over the course of 30 minutes. The temperature was kept at 60° C. by gentle cooling. The mixture was then stirred for a further 30 minutes at 60° C. Thereafter the reaction product was concentrated at 30 mm. Hg pressure until the water had been distilled off azeotropically. Thereafter the salt was filtered off and washed with a little epichlorhydrin. Subsequently the product was further concentrated, first under a vacuum of 20 mm. Hg in order to recover the epichlorhydrin and then under a vacuum of 0.2 mm. Hg in order to remove the volatile constituents.

96.8 grams of a clear yellow resin were obtained which contained 7.3 epoxy equivalents/kg. The product was completely water-soluble. It principally consisted of N,N'-diglycidyl-5-methyl-hydantoin.

Example 3

A mixture of 20 grams of hydantoin, 277.5 grams of epichlorohydrin and 0.1 gram of benzyl trimethylammonium chloride was heated to boiling at 115° C. After 2½ hours a resin of 4.5 epoxy equivalents/kg. was obtained after removing the epichlorohydrin. Thereafter the mixture was cooled to 60° C. and mixed over the course of 40 minutes with 17.3 grams of 97% strength sodium hydroxide (added in stages). The mixture was subsequently stirred for a further 30 minutes at 60° C. The reaction product was then concentrated under a vacuum of 30 mm. Hg in order azeotropically to distil off the resulting water. Subsequently the resulting salt was washed with a little epichlorhydrin. The product was then concentrated as described in Example 2.

31 grams of a brown viscous resin which contained 5.95 epoxy equivalents/kg. were obtained. The product was completely water-soluble. It principally consists of N,N'-diglycidylhydantoin.

Example 4

A mixture of 168 grams of 1,3-diaza-spiro-(4.5)-decane-2,4-dione of formula

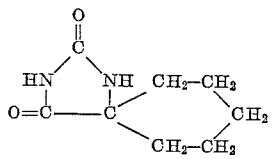

2775 grams of epichlorhydrin and 1.6 grams of benzyl trimethyl ammonium chloride was heated to boiling at 117° C. As in Example 1, the formation of N-glycidyl groups during the reaction was followed by titration of samples after distilling off the unreacted epichlorhydrin. After 2½ hours the mixture contained 3.65 epoxy equivalents/kg. Thereafter the mixture was cooled to 60° C. and mixed over the course of 40 minutes with 91 grams of 97% strength sodium hydroxide in stages. The mixture was thereafter stirred for a further 30 minutes at 60° C. The resulting water was then distilled off azeotropically at 30 mm. Hg pressure together with epichlorhydrin. The resulting salt was then filtered off and washed with a little epichlorhydrin. Subsequently the reaction mixture was further concentrated, first under a vacuum of 20 mm. Hg in order to recover the epichlorhydrin and then at 0.2 mm. Hg in order to remove the last volatile constituents. 282 grams of a brown highly viscous resin which contained 5.6 epoxy equivalents per kg. as well as 1.7% of chlorine were obtained. This principally consists of N,N'-diglycidyl-1,3-diaza-spiro(4.5)-decane-2,4-dione.

Example 5

A mixture of 10 grams of parabanic acid, 121 grams of epichlorhydrin and 0.05 gram of benzyl trimethylammonium chloride was heated to boiling. After 2 hours the resulting concentrated resin contained 3.9 epoxide equivalents/kg. Thereafter the mixture was treated with 7.7 grams of 97% strength NaOH and dried, filtered and concentrated as described in Example 1. 16 grams of a brown viscous resin were obtained, which contained 4.3 epoxide equivalents/kg. The product was completely water-soluble. It principally consists of N,N'-diglycidylparabanic acid.

Example 6

A mixture of 138.6 g. of 1,3-diaza-spiro-(4.4)-nonan-2,4-dione of the formula

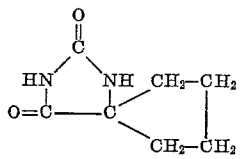

2498 g. of epichlorhydrin and 1.2 g. of benzyltrimethylammonium chloride was heated to the boiling temperature of 117° C. As in Example 1, the formation of N-glycidyl groups was followed by titration of samples after distilling off the unreacted epichlorhydrin. After 2½ hours the resin contained 4.18 epoxide equivalents per kg. The mixture was then cooled to 60° C. and treated with 817 g. of 97% strength sodium hydroxide, as in Example 4. Also as in Example 4, the reaction product was freed from water, filtered and concentrated. There were obtained 222 g. of a yellow, viscous resin which contained 6.6 epoxide equivalents per kg. and 1.5% of chlorine. It consists substantially of N,N'-diglycidyl - 1,3-diaza-spiro (4.4)-nonan-2,4-dione.

Example 7

A mixture of 85.2 g. of 5-propylhydantoin, 1665 g. of epichlorhydrin and 0.8 g. of benzyltrimethylammonium chloride was heated to the boil. After 2½ hours the resulting resin from which unreacted epichlorhydrin had been distilled off contained 3.99 epoxide equivalents per kg. The mixture was finally treated with 54.6 g. of 97% strength sodium hydroxide and, as described in Example 1, freed from water, filtered and concentrated. There were obtained 113.5 g. of a yellow resin which contained 7.26 epoxide equivalents per kg. and 1.9% of chlorine. The product consists substantially of N,N'-diglycidyl-5-propylhydantoin.

Example 8

A mixture of 35.5 g. of 5-methyl-5-ethyl-hydantoin, 694 g. of epichlorhydrin and 0.4 g. of benzyltrimethylammonium chloride was heated to the boil. After 2½ hours the resulting resin from which unreacted epichlorhydrin had been distilled off contained 3.99 epoxide equivalents per kg. The mixture was finally treated with 22.7 g. of 97% strength sodium hydroxide and, as described in Example 1, freed from water, filtered and concentrated. There were obtained 58.5 g. of a yellow resin which contained 7.09 epoxide equivalents per kg. and had a viscosity of 3600 cp. The product was completely soluble in water. It consists substantially of N,N'-diglycidyl-5-methyl-5-ethyl-hydantoin.

Example 9

100 parts of the diglycidyl compound described in Example 1 [N,N'-diglycidyl-5,5-dimethyl-hydantoin] having an epoxide content of 7.7 epoxide equivalents/kg. were stirred at 80° C. with 10 parts of polypropylene glycol (mean molecular weight 1025) and 100 parts of hexhydrophthalic anhydride as the curing agent, to give a homogeneous casting resin composition, and were cured in aluminium moulds (140 x 40 x 12 mm.; 130 x 130 x 4 mm.) for 4 hours at 80° C. and subsequently for 12 hours at 120° C., whereupon almost colourless clear mouldings are obtained.

The cured mouldings had the following mechanical and electrical properties:

| | |
|---|---|
| Flexural strength (VSM 77,103) kg./mm.² | 15 |
| Deflection on fracture mm. | 10 |
| Flexural impact strength (VSM 77,105) cm. kg./cm.² | 17 |
| Dimensional heat stability according to Martens (DIN 53458) ° C. | 136 |
| Tracking resistance (VDE 0303) | Level KA 3 c |
| Carbon arc resistance (VDE 0303) | Level L 4 |

Example 10

In a first sample, 1000 parts of N,N-diglycidyl-5,5-dimethylhydantoin (prepared according to Example 1) having an epoxide content of 7.7 epoxide equivalents/kg. are mixed with 400 parts of 3-cyclohexylamino-propylamine (commercially available under the registered trade name "LAROMIN C 252") and subsequently processed into a casting mortar by adding 2,600 parts of quartz sand of particle size 0.8–1.2 mm. and 2,600 parts of quartz flour of particle size $<60\mu$.

In a second sample, 1000 parts of a liquid epoxide resin having an epoxide content of 5.3 epoxide equivalents/kg., manufactured by reacting 4,4'-dihydroxydiphenyl-dimethylmethane and epichlorhydrin in the presence of alkali, are mixed with 300 parts of 3-cyclohexylamino and processed with 2,850 parts of quartz sand of particle size 0.8–1.2 mm. and 2000 parts of quartz flour of particle size $<60\mu$, again to give a flowable mortar.

These two synthetic resin mortars are each used to glue together two concrete prisms of size 4 x 4 x 8 cm. which are stored in water for at least 24 hours, in such a way that glue lines of 1 cm. thickness are produced. The glued test specimens are stored for 3 days at room temperature and 95–100% atmospheric moisture and are then subjected to a flexural tensile test.

| | Flexural tensile strength, kg./cm.² | Assessment of fracture |
|---|---|---|
| Sample 1 | 85.0/82.1 | Concrete fracture. |
| Sample 2 | 17.6/31.5 | Fracture of the adhesive surface. |

The technical problem of gluing moist or wet concrete could hitherto not be satisfactorily solved and posed one of the greatest obstacles to the use of adhesives in building. As is proved by sample 1 of the above example, it is possible to solve this technical problem by means of the epoxide resin of the invention.

Example 11

An aqueous coating composition which consisted of 100 parts by weight of a 50% strength aqueous dispersion of a copolymer of 85% of isobutyl acrylate, 10% of acrylonitrile and 5% of acrylic acid and 3 parts by weight of ammonia was produced. The mixture thickened as a result of the addition of ammonia. Thereafter 5 parts by weight of the N,N'-diglycidyl-5,5-dimethylhydantoin manufactured according to Example 1 and 50 parts by weight of so-called white spirit were stirred in. A spreadable thick mass which was well suited to the coating of fabrics on knife-coating machines was produced, and with it a fine polyamide fabric of 70 grams/square metre was coated on one side by 2 passes on an air knife machine. After the application of each coating the material was dried at a temperature of 60 to 80° C. and at the end the material was heat-fixed for 5 minutes in a hot air apparatus for 5 minutes at 150° C.

The amount applied was so adjusted that a dry coating of about 15 grams/square metre of fabric surface resulted.

The resulting coatings were very water-tight, and resistant to washing and solvents.

Example 12

A viscous spreading composition dissolved in organic solvents was prepared by mixing 100 parts by weight of a mixture of 60% ethyl acetate and 40% of a copolymer of 30% vinyl acetate, 65% butyl acrylate and 5% acrylic acid with 5 parts by weight of N,N'-diglycidyl-5,5-dimethylhydantoin and 25 parts by weight of ethyl acetate; this composition was applied to a 70 grams/square metre fine polyamide fabric, and fixed, as in the earlier Example 11. Dry flexible water-tight coatings which were wash-resistant and solvent-resistant were obtained.

TABLE

| Sample | Example 6 | Example 7 |
|---|---|---|
| Acrylic acid copolymer according to Example 6 (g.) | 100 | |
| Acrylic acid copolymer according to Example 7 (g.) | | 100 |
| N,N'-diglycidyl-5,5-dimethyl-hydantoin (g.) | 5 | 5 |
| White spirit | 50 | |
| Ethyl acetate (g.) | | 25 |
| Dry coating weight after twice coating on one side (g./m.²) | 15 | 15 |
| Assessment of samples: | | |
| Wash fastness | Good | Good |
| Washed 3 times according to SNV-3 | | |
| Loss of coating in percent after treatment with trichor ethylene | 3.2 | 3,7 |

Example 13

20 parts of the dyestuffs of formula

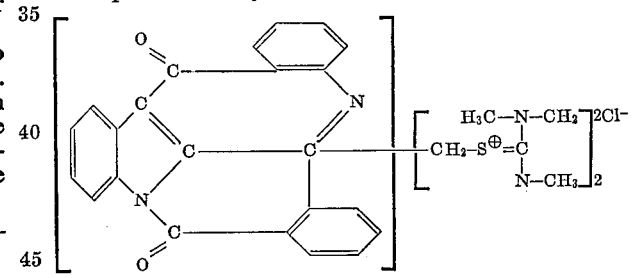

are dissolved in 500 parts of a 2% strength aqueous solution of thiourea and mixed with 500 parts of a 5% strength aqueous solution of the N,N'-diglycidyl-5,5-dimethylhydantoin obtained according to Example 1. A mercerised cotton fabric is impregnated with this solution, squeezed out to 80% weight increase, dried at 150° C. and fixed for 1 minute at 180° C. A yellow dyeing which is fast to washing at the boil results. If the addition of thiourea is omitted the fixing is not quite so good and the dyeing has to be washed in order to remove non-fixed constituents. Without the addition of N,N-diglycidyl-5,5-dimethylhydantoin a dyeing which is not fast to washing results.

We claim:
1. A N,N'-diglycidyl compound of the formula

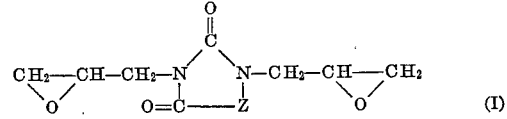

wherein Z represents a member selected from the group consisting of the group $>C=O$ and a group

in which $R_1$ and $R_2$ each are members selected from the group consisting of hydrogen and lower alkyl, and $R_1$ and R₂ together form a bivalent radical selected from the group consisting of tetramethylene and pentamethylene.

2. N,N'-diglycidyl-hydantoin.
3. N,N'-diglycidyl-5-methyl-hydantoin.
4. N,N'-diglycidyl-5,5-dimethyl-hydantoin.
5. N,N'-diglycidyl-parabanic acid.
6. N,N'-diglycidyl - 1,3 - diaza-spiro(4.5)-decane-2,4-dione.
7. N,N'-diglycidyl - 1,3 - diaza-spiro(4.4)-nonane-2,4-dione.
8. N,N'-diglycidyl-5-propyl-hydantoin.
9. N,N'-diglycidyl-5-methyl-5-ethyl-hydantoin.

References Cited

UNITED STATES PATENTS 3,391,097  7/1968  Williamson _____ 260—309.5

NORMA S. MILESTONE, *Primary Examiner.*
NATALIE TROUSOF, *Assistant Examiner.*

U.S. Cl. X.R.

8—21, 39, 41, 42, 51, 54, 55, 74, 88; 117—135.5, 138.5; 156—330; 161—184; 252—8.8; 260—2, 47, 78.4, 830, 831, 834, 836, 837